(No Model.) 3 Sheets—Sheet 1.

B. FRESE.
STEM WINDING AND SETTING WATCH.

No. 419,654. Patented Jan. 21, 1890.

Witnesses:
Flora L. Brown,
Frank L. Ford,

Inventor:
Bernard Frese,
By Charles J. Brown,
Atty.

(No Model.) 3 Sheets—Sheet 2.
B. FRESE.
STEM WINDING AND SETTING WATCH.
No. 419,654. Patented Jan. 21, 1890.
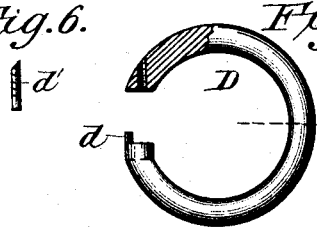
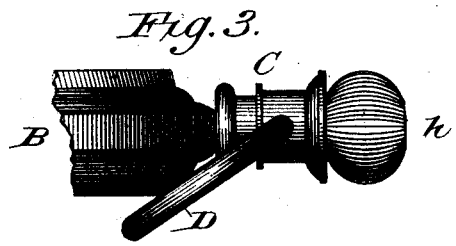
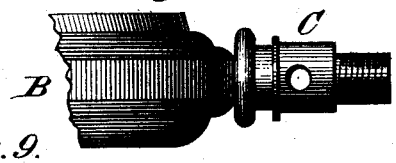
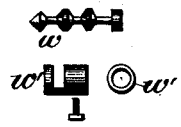
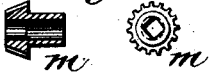
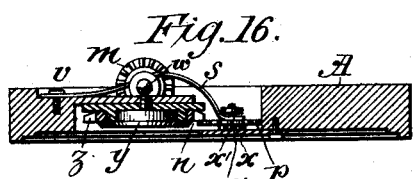
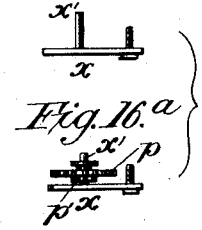
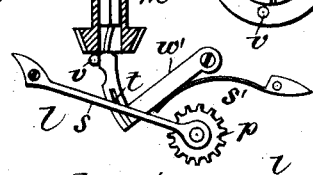
Witnesses:
Flora L. Brown
Frank L. Ford
Inventor:
Bernard Frese,
By Charles T. Brown,
Atty.

(No Model.) 3 Sheets—Sheet 3.
B. FRESE.
STEM WINDING AND SETTING WATCH.
No. 419,654. Patented Jan. 21, 1890.
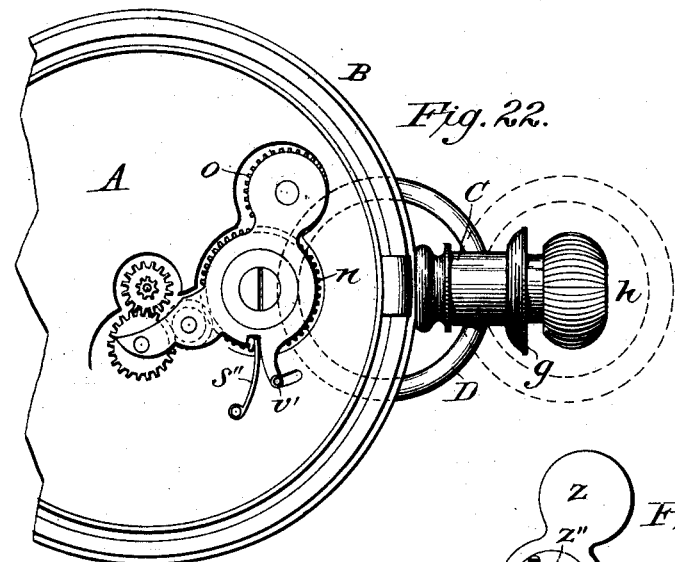
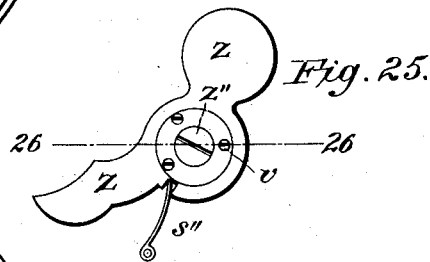
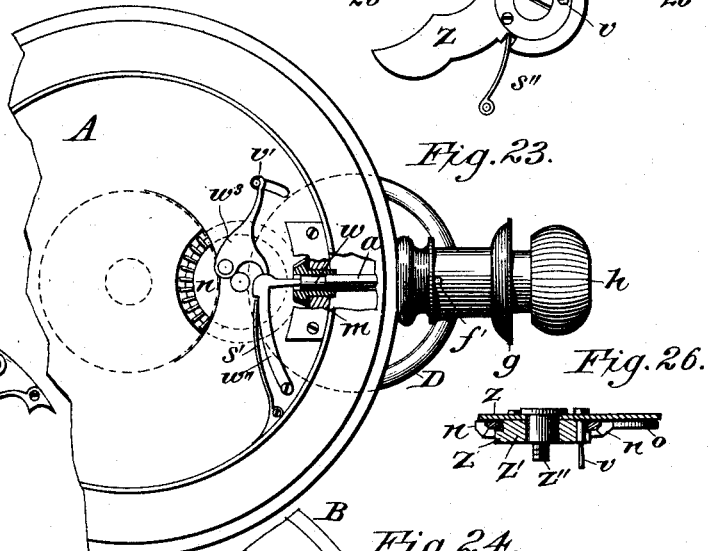
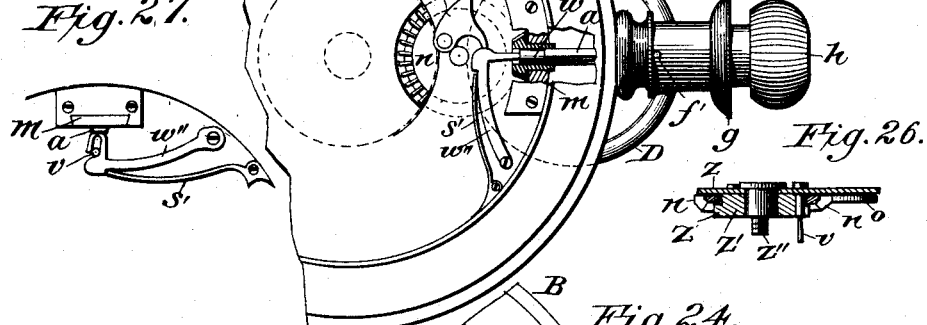
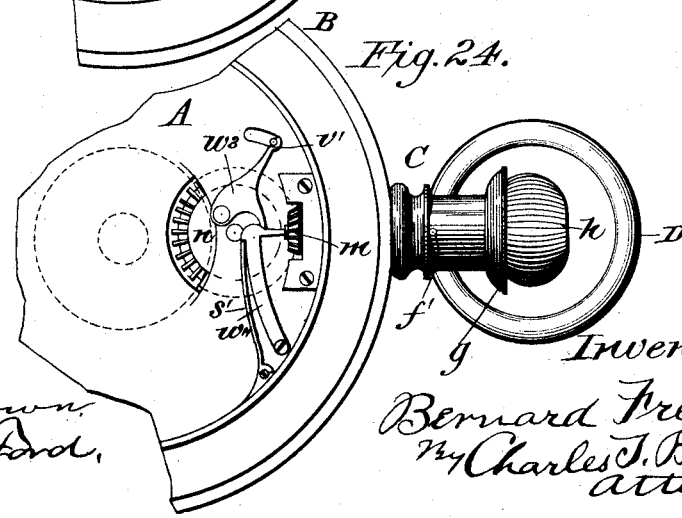
Witnesses:
Flora L. Brown,
Frank L. Ford,
Inventor:
Bernard Frese,
By Charles T. Brown,
Atty

UNITED STATES PATENT OFFICE.

BERNARD FRESE, OF CHICAGO, ILLINOIS.

STEM WINDING AND SETTING WATCH.

SPECIFICATION forming part of Letters Patent No. 419,654, dated January 21, 1890.

Application filed October 11, 1886. Serial No. 215,917. (No model.)

*To all whom it may concern:*

Be it known that I, BERNARD FRESE, a citizen of the United States, residing at Chicago, in the county of Cook and State of Illinois, have invented certain new and useful Improvements in Stem Winding and Setting Watches and Pendants therefor, of which the following is a specification.

This invention is an improvement on my invention set out and claimed in Patent No. 350,425, dated October 5, 1886, and I therefore hereby disclaim in this application so much of the invention described herein as is described and claimed in my above-named patent.

The object of my invention is to obtain, first, a stem-winding pendant independent of, while applicable to stem winding and setting watch-movements; second, such stem winding and setting pendant, after having been used to set the hands of the watch, to be automatically forced in position to wind the watch upon freeing the bow of the pendant; third, to secure a movement in a stem winding and setting watch independent of the pendant, and having its parts adapted to automatically shift to the winding position when the movement is removed from the case, and, fourth, to obtain a combination of a pendant of the character described with a movement of the kind above set forth and fitted to accomplish all the several above-named results.

I have illustrated my invention by the drawings accompanying this specification and forming a part thereof, in which—

Figure 1:
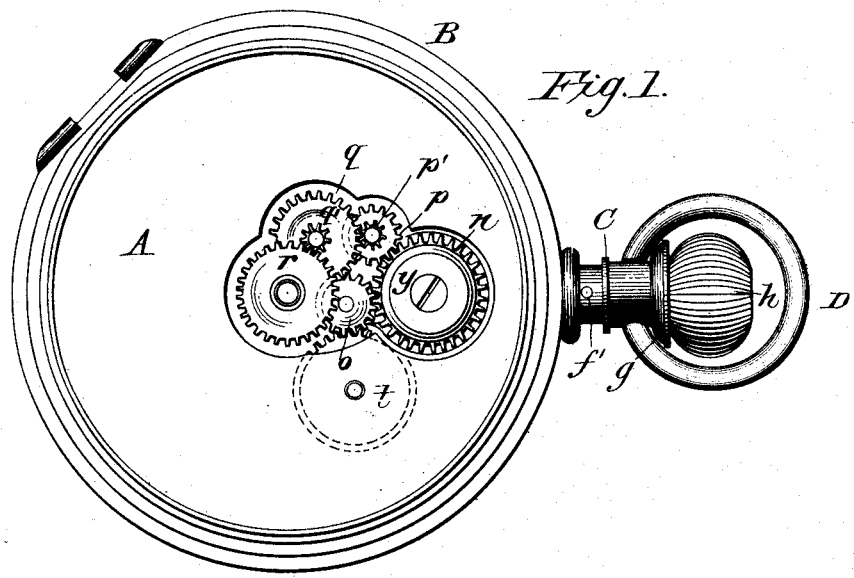
Figure 2:
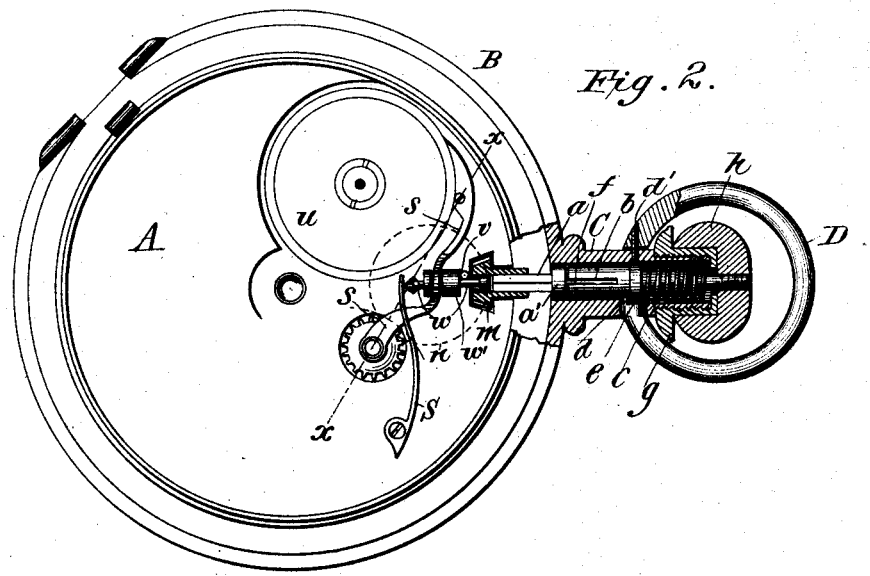

Figure 1 is a front view of a watch with the bezel and dial removed. Fig. 2 is a back view having the back, back cap, and plate removed, and showing only those parts relating to my invention, most of them in section. Figs. 3 to 9 (both inclusive) and 13, 14, and 15 are explanatory of the different parts forming the pendant. Fig. 3 is an elevation of the pendant; Fig. 4, a plan view of the bow; Fig. 5, a sectional view of the bow; and Fig. 6 is a plan view of the pin placed in the bow and forming an eccentric-pin, imparting, when the bow is rotated in the pendant, a longitudinal movement to the winding-bar illustrated in Fig. 7. Fig. 8 is an elevation of a sleeve or hollow shaft which is placed on the winding-bar illustrated in Fig. 7. Fig. 9 is a spiral spring which is placed on sleeve illustrated in Fig. 8. Fig. 13 is an elevation of a watch-pendant having the cap and crown removed therefrom. Fig. 14 is an elevation of the cap with a portion broken away, showing the thread cut therein; and Fig. 15 is a cross-section of the crown. Figs. 10 to 12 and 16 to 19, all inclusive, are explanatory figures of different parts in the movement of the watch forming a "shipping mechanism," so termed, Fig. 10 being a plan view and an elevation of a beveled wheel meshing with the crown-wheel of the watch and having a square hole therein, into which the winding-bar loosely fits. Fig. 11 is an elevation of a grooved rod squared at one end, and also fitting into the square hole in bevel-wheel illustrated in Fig. 10. Fig. 12 is an elevation of a sleeve in which the grooved rod illustrated in Fig. 11 fits and freely moves. Fig. 16 is a cross-section of the yoke and connecting parts used in my invention. Fig. 17 is a plan view of a yoke which vibrates on the same center the crown-wheel turns on. This yoke has a pin placed therein near the outer edge of it, and the movement of the pin to the right or left causes the yoke to vibrate. Figs. 18 and 19 are cross-sections of the yoke. Figs. 20 and 21 illustrate one form of construction of the shipping mechanism, Fig. 20 being a cross-section of the bevel-wheel illustrated in Fig. 10, a plan view of a jointed lever turning on a fulcrum and forming a modification of the continuation of the winding-bar illustrated in Fig. 11, and a plan view of a spring-lever operated by the movement of the jointed lever and carrying at one end an intermediate wheel which is in gear when the hands are being set. Fig. 21 is a cross-section of the jointed lever at the point where the spring-lever rests upon it. Figs. 22 to 24, both inclusive, illustrate a form of construction of the shipping mechanism; and Figs. 25, 26, and 27, another form. Fig. 22 is a plan view illustrating a yoke carrying a winding and setting train of wheels, the yoke being a modification of the yoke illustrated in Figs. 17, 18, and 19 to the extent that it carries two additional wheels. The yoke is vibrated around the same center the crown-wheel rotates around by the movement of a pin secured in the yoke in precisely the same manner as the yoke illustrated in Figs. 17, 18, and 19 is vibrated. This pin passes through a slot in the plate of the watch, and the manner in which it is actuated is illustrated in Figs. 23 and 24, which are plan views of the back of the plate with the pin in different positions. Fig. 25 is a plan of the yoke illustrated in Fig. 22, with the pin placed in a different place on said yoke. Fig. 26 is a cross-section of Fig. 25 on line 26 26. Fig. 27 is a plan of a lever actuating the yoke illustrated in Figs. 25 and 26 by producing movement in the pin placed on the yoke, the pin moving in the arc of a circle having as a radius the distance from the pin to the center of the crown-wheel.

Like letters refer to like parts throughout the several views.

The cap $g$, Figs. 2 and 14, is screwed on stem C, Figs. 1, 2, 3, and 13, and through the center of said cap passes the winding-bar $a$, Figs. 2 and 7. Winding bar $a$ has a shoulder $a'$, against which sleeve $b$, Figs. 2 and 8, also provided with a shoulder $e$ and having slot $f$, rests. The bow D, Figs. 4, 5, and 6, has an eccentric-pin $d$ on one end. The spring $c$, Figs. 2 and 9, slips over the sleeve $b$ and bears on the shoulder $e$ on one end and on the inner face of cap $g$ on the other end. The eccentric-pin $d$ passes under the shoulder $e$ and receives the thrust from the spring $c$. The crown $h$, Figs. 2 and 15, fits over the cap $g$ and has the winding-bar $a$, Fig. 7, screwed in it in the usual way. When the bow is turned down, as is shown in Figs. 3, 22, and 23, the sleeve $b$ is pressed or lifted by the eccentric-pin $d$ on the bow backward against the pressure of the spring $c$, and the end of the sleeve $b$ (ordinarily in contact with shoulder $a'$ on winding-bar $a$) is thus drawn away from said shoulder and the winding-bar relieved from all pressure or action of spring $c$. Upon releasing bow D from the position illustrated in Figs. 3, 22, and 23 the pressure of spring $c$ upon shoulder $e$ of sleeve $b$, at all times pressing against said shoulder, forces the sleeve in toward shoulder $a'$ on winding-bar $a$, turning bow D by eccentric-pin $d$ into the position illustrated in Figs. 1, 2, and 24, at which time sleeve $b$ again presses on shoulder $a'$ of winding-bar $a$, holding said winding-bar firmly in position.

Winding-bar $a$ may be slotted at its inner end, as $a^2$, Fig. 7, and a spring set given said slotted end, in order to prevent the winding-bar $a$ following out the movement of sleeve $b$ either by gravity or the action of spring S, Fig. 2, or its equivalent, in case bow D is accidentally moved to the position illustrated in Fig. 3; but when the bow is turned down, as illustrated in Fig. 3, the pressure is removed from winding-bar $a$ in the manner just described, and said winding-bar may be easily drawn out to the extent sleeve $b$ has been moved outward.

Crown $h$ has an inward movement sufficient to release the spring holding the front cover in hunting-case watches in position, so that the front cover may be opened in the ordinary way.

So much of my invention as has been described relates to the pendant of a stem winding and setting watch, and may therefore be manufactured with or manufactured and placed in as a part of the case of such stem winding and setting watch.

I have illustrated several ways of constructing the necessary mechanism in a stem winding and setting movement in order to properly combine with the above-described pendant. These several ways are, first, the mechanism illustrated by Fig. 2, a detail of which is shown by Figs. 10, 11, 12, 16, 16$^a$, 17, 18, 19, and 25, hereinbefore described; second, the mechanism illustrated in Figs. 10, 17, 18, 19, 20, and 21, forming a modification of the mechanism illustrated by Fig. 2; third, the mechanism illustrated in Figs. 22, 23, and 24; fourth, the method illustrated in Figs. 24, 25, and 26.

In the first way named the construction and operation of the shipping mechanism are, the longitudinal movement of a detached elongation $w$, Figs. 2 and 11, of the winding-bar $a$, Figs. 2 and 7, having grooves turned therein, partially rotates yoke Z by pin V, the pin V moving in an arc around the center on which the crown-wheel turns, the yoke being held in such position by spring $s''$, Fig. 25, that pin $v$ is pressed against elongation $w$ of the winding-bar. Sleeve $w'$, Figs. 2 and 11, is placed on elongation $w$, and a light spring $s$ passes through the slot in the sleeve and rests upon elongation $w$. The longitudinal motion of elongation $w$ thus raises or lowers the spring, which presses downward upon the grooves in said elongation $w$. To the outer end of spring $s$ there is attached pinion $p$, and as the spring is raised or lowered by such longitudinal motion of elongation $w$ pinion $p$ is meshed with or released from wheel $n$, Figs. 1 and 2. The yoke Z and spring $s$ thus operate in unison to either engage the winding-bar and mainspring or the winding-bar and hands by the longitudinal movement of the winding-bar and elongation $w$.

By the mechanism illustrated by Figs. 10, 17, 18, 19, 20, and 21 the straight spring S and lever $w'$, Fig. 20, are substituted for spring S and elongation $w$, Fig. 16, in the shipping mechanism above described. On the face of lever $w'$, Fig. 20, are placed ribs or projections $l$. (Shown in section in Fig. 21.) In other respects this mechanism is identical with the first-described shipping mechanism, the longitudinal movement of the prolongation of the winding-bar producing a vibrating motion in the yoke by pin $v$, Figs. 17 and 20, being moved in an arc of a circle around the center of the crown-wheel by such lateral movement.

By the method of constructing the shipping mechanism illustrated in Figs. 20, 22, 23, and 24 the yoke is placed on the upper or face side of the wheels carried by such yoke, and on a prolongation of the yoke is placed a pin $v'$, which passes through the plate B and presses against lever $w^3$, Figs. 23 and 24, lever $w^3$ being operated or thrown by lever $w''$, Figs. 23 and 24, or by lever $w'$, Fig. 20. In case lever $w'$, Fig. 20, is used in this modification lugs or projections $l$ are not required. Examination of the yoke used in this modification shows that all the wheels or pinions necessary to either wind or set the watch by the winding-bar, as desired, are carried by such yoke, and spring S, used in the first two shipping mechanisms above described, is dispensed with.

In the fourth and last shipping mechanism herein described the yoke is provided with a cap fastened to the under side by screws, as $z$, Fig. 26, and one of the screws holding the two parts together is prolonged, forming pin $v$, which presses directly against lever $w''$, Fig. 27, and the turning of the yoke thereby is effected by said lever. In this modification the lever $w'$ (shown in Fig. 20) may be substituted for lever $w''$, Fig. 27.

In the last two modifications a short circular piece of metal or rod $w^4$, Fig. 23, to lengthen winding-bar $a$ in like manner as $w$, Fig. 11, lengthens said winding-bar, is preferably used, so that the movement may be easily taken from the case, and when the movement is thus taken from the case spring S, Fig. 2, $s$, Fig. 20, and $s'$, Figs. 23 and 27, force lever or prolongation $w$, Fig. 2, $w'$, Fig. 20, and $w''$, Figs. 23 and 27, forward into a third position, in which the winding-bar is in gear with the winding-ratchet of the watch.

In all these several modifications above described it will be observed that the several levers $w$, Fig. 11, acting longitudinally, are forced against the end of the winding-bar by a spring, and the winding or hand-setting parts of the watch are thus severally engaged, as desired, and that such modifications are substantially alike in principle.

Having thus described my invention, what I claim, and desire to secure by Letters Patent, is—

1. In a stem winding and setting watch, the combination of crown $h$, cap $g$, winding-bar $a$, having shoulder $a'$, sleeve $b$, having shoulder $e$, spring $c$, bow D, having eccentric-pin $d$, lever $w''$, actuated by spring $s'$, and yoke Z, having pin $v'$, and a stem-driven train thereon, all substantially as described, and for the purpose set forth.

2. In a stem winding and setting watch, lever $w''$, actuated by spring $s$ and pressing against the end of the winding-bar or intermediate part $w$, in combination with yoke Z, having pin $v'$ and a stem-driven train thereon, all substantially as described, and for the purpose set forth.

3. In a pendant for stem winding and setting watch cases, the combination of crown $h$, cap $g$, winding-bar $a$, having shoulder $a'$, sleeve $b$, having shoulder $e$, spring $c$, and bow D, having eccentric-pin $d$, all substantially as described, and for the purpose set forth.

4. In a pendant for stem winding and setting watch cases, the combination of crown $h$, cap $g$, winding-bar $a$, having shoulder $a'$, and slot $a^2$, sleeve $b$, having shoulder $e$ and slots $f$ $f$, spring $c$, and bow D, having eccentric-pin $d$, all substantially as described, and for the purpose set forth.

BERNARD FRESE.

Witnesses:
FRED W. SAWYER,
CHARLES T. BROWN.